(12) United States Patent
Grzonka et al.

(10) Patent No.: US 8,029,679 B2
(45) Date of Patent: Oct. 4, 2011

(54) POWERED CARTRIDGES AND OTHER DEVICES WITHIN HOUSINGS

(75) Inventors: Michael T. Grzonka, Hudson, NH (US); Aaron Burke, Hamilton, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 12/910,917

(22) Filed: Oct. 25, 2010

(65) Prior Publication Data

US 2011/0043164 A1 Feb. 24, 2011

Related U.S. Application Data

(60) Division of application No. 12/715,496, filed on Mar. 2, 2010, now Pat. No. 7,901,570, which is a continuation of application No. 11/582,577, filed on Oct. 17, 2006, now Pat. No. 7,699,989.

(51) Int. Cl.
*B01D 37/00* (2006.01)
*B01D 35/14* (2006.01)

(52) U.S. Cl. ............... 210/767; 95/1; 95/273; 210/739; 210/746; 204/554; 204/555

(58) Field of Classification Search ............ 210/85–87, 210/90, 91, 96.1, 96.2, 103, 104, 137, 143, 210/321.6, 321.78–321.8, 637, 650, 651, 210/739–745, 222, 223, 243, 748.01, 323.2, 210/695, 767, 746; 95/1, 14–16, 19–23, 95/45–52, 273; 96/6–11, 417–423; 422/101, 422/105–112, 534, 535; 204/627, 640, 664, 204/665, 666, 554–557; 375/220, 222
See application file for complete search history.

(56) References Cited

U.S. PATENT DOCUMENTS

| | | | |
|---|---|---|---|
| 4,865,747 A * | 9/1989 | Larson et al. | 210/695 |
| 5,074,998 A | 12/1991 | DeBaat Doelman | |
| 5,089,129 A | 2/1992 | Brigman | |
| 5,540,107 A | 7/1996 | Silverman et al. | |

(Continued)

FOREIGN PATENT DOCUMENTS

GB 2 015 900 9/1979
(Continued)

OTHER PUBLICATIONS

European communication dated Feb. 11, 2008 in corresponding foreign application.
(Continued)

*Primary Examiner* — Joseph Drodge
(74) *Attorney, Agent, or Firm* — Nields, Lemack & Frame, LLC

(57) ABSTRACT

The present invention describes a system and method for supplying electrical power to a device, such as a filter element, located within a housing. In one embodiment, a conductive coil is embedded into the housing base, and a second coil is embedded into the filter element. Current is then passed through the coil in the housing base. Through induction, a current is created in the second coil in the filter element, in much the same way as a transformer functions. This inductive field may interfere with the operation of the various electronic functions, such as communications, sensing or other activities. To overcome this issue, an energy storage component, such as a capacitor, is included in the filter electronics. In this way, the power generated by the inductive field can be stored, and used when the inductive field is no longer present.

15 Claims, 6 Drawing Sheets

U.S. PATENT DOCUMENTS

| | | | |
|---|---|---|---|
| 5,674,381 A | 10/1997 | Den Dekker et al. | |
| 5,864,580 A | 1/1999 | Lowe et al. | |
| 6,471,853 B1 | 10/2002 | Moscaritolo | |
| 6,551,503 B2 | 4/2003 | Niers et al. | |
| 6,558,444 B1 | 5/2003 | Hunter | |
| 6,706,170 B1 | 3/2004 | De Baat Doelman | |
| 6,852,216 B2 | 2/2005 | Moscaritolo et al. | |
| 6,918,952 B2 | 7/2005 | van der Maas | |
| 6,936,160 B2 | 8/2005 | Moscaritolo et al. | |
| 7,048,775 B2 | 5/2006 | Jornitz et al. | |
| 7,481,917 B2 | 1/2009 | Ikeyama et al. | |
| 7,699,989 B2 * | 4/2010 | Grzonka et al. | 210/650 |
| 7,901,570 B2 * | 3/2011 | Grzonka et al. | 210/85 |
| 2002/0144938 A1 | 10/2002 | Hawkins et al. | |
| 2003/0010205 A1 | 1/2003 | Bikson et al. | |
| 2004/0256328 A1 | 12/2004 | Jornitz et al. | |
| 2005/0205658 A1 | 9/2005 | Baker et al. | |
| 2005/0236308 A1 | 10/2005 | Lin | |
| 2007/0243113 A1 | 10/2007 | DiLeo | |
| 2008/0060983 A1 | 3/2008 | Kleber | |
| 2008/0087589 A1 | 4/2008 | Grzonka et al. | |

FOREIGN PATENT DOCUMENTS

| | | |
|---|---|---|
| WO | 00/32298 A1 | 6/2000 |
| WO | 2005/113112 A1 | 12/2005 |
| WO | 2006/050934 | 5/2006 |
| WO | 2006/136409 | 12/2006 |

OTHER PUBLICATIONS

Chinese communication dated Sep. 4, 2009 in corresponding foreign application.

Japanese communication dated Aug. 10, 2010 in corresponding foreign application (JP 2007-268893).

Office Action dated Jun. 8, 2009 in a corresponding U.S. Appl. No. 11/582,577.

Final Rejection dated Oct. 30, 2009 in a corresponding U.S. Appl. No. 11/582,577.

Notice of Allowance dated Feb. 3, 2010 in a corresponding U.S. Appl. No. 11/582,577.

Office Action dated Oct. 15, 2010 in a corresponding U.S. Appl. No. 12/715,496.

Notice of Allowance dated Dec. 9, 2010, in a corresponding U.S. Appl. No. 12/715,496.

* cited by examiner

POWERED CARTRIDGES AND OTHER DEVICES WITHIN HOUSINGS

This application is a divisional application of U.S. patent application Ser. No. 12/715,496 now U.S. Pat. No. 7,901,570 filed Mar. 2, 2010, which is a continuing application of U.S. patent application Ser. No. 11/582,577 now U.S. Pat. No. 7,699,989, filed Oct. 17, 2006, the disclosures of which are incorporated herein by reference.

BACKGROUND OF THE INVENTION

The use of wireless communication has become prevalent, especially in the management of assets, particularly those applications associated with inventory management. For example, the use of RFID tags permits the monitoring of the production line and the movement of assets or components through the supply chain.

To further illustrate this concept, a manufacturing entity may adhere RFID tags to components as they enter the production facility. These components are then inserted into the production flow, forming sub-assemblies in combination with other components, and finally resulting in a finished product. The use of RFID tags allows the personnel within the manufacturing entity to track the movement of the specific component throughout the manufacturing process. It also allows the entity to be able to identify the specific components that comprise any particular assembly or finished product.

In addition, the use of RFID tags has also been advocated within the drug and pharmaceutical industries. In February 2004, the United States Federal and Drug Administration issued a report advocating the use of RFID tags to label and monitor drugs. This is an attempt to provide pedigree and to limit the infiltration of counterfeit prescription drugs into the market and to consumers.

Since their introduction, RFID tags have been used in many applications, such as to identify and provide information for process control in filter products. U.S. Pat. No. 5,674,381, issued to Den Dekker in 1997, discloses the use of "electronic labels" in conjunction with filtering apparatus and replaceable filter assemblies. Specifically, the patent discloses a filter having an electronic label that has a read/write memory and an associated filtering apparatus that has readout means responsive to the label. The electronic label is adapted to count and store the actual operating hours of the replaceable filter. The filtering apparatus is adapted to allow use or refusal of the filter, based on this real-time number. The patent also discloses that the electronic label can be used to store identification information about the replaceable filter.

A patent application by Baker et al, published in 2005 as U.S. Patent Application Publication No. US2005/0205658, discloses a process equipment tracking system. This system includes the use of RFID tags in conjunction with process equipment. The RFID tag is described as capable of storing "at least one trackable event". These trackable events are enumerated as cleaning dates, and batch process dates. The publication also discloses an RFID reader that is connectable to a PC or an internet, where a process equipment database exists. This database contains multiple trackable events and can supply information useful in determining "a service life of the process equipment based on the accumulated data". The application includes the use of this type of system with a variety of process equipment, such as valves, pumps, filters, and ultraviolet lamps.

Another patent application, filed by Jornitz et al and published in 2004 as U.S. Patent Application Publication No. 2004/0256328, discloses a device and method for monitoring the integrity of filtering installations. This publication describes the use of filters containing an onboard memory chip and communications device, in conjunction with a filter housing. The filter housing acts as a monitoring and integrity tester. That application also discloses a set of steps to be used to insure the integrity of the filtering elements used in multi-round housings. These steps include querying the memory element to verify the type of filter that is being used, its limit data, and its production release data. This application also describes an internal transponder for relaying information to an external monitoring and test unit. An antenna is arranged adjacent to the transponder on the filter housing.

Many of these applications require that the devices within the housing be electrically powered. While the use of small batteries may be sufficient for some applications, in many applications, and even more potential future applications, this small amount of power provided by such batteries is insufficient to power the electronics within the housing.

Incorporating a power connector in the filter element to connect to a suitable mating connector in the housing may be problematic. Such a solution requires mating connectors that are capable of tolerating extreme conditions, such as temperature (particularly during molding and steam cleaning), and fluid flow. Therefore, issues such as the quality and integrity of the seal between these connectors may be suspect.

Thus, there is a need to reliably provide power to devices, such as filter elements, enclosed in a housing without sacrificing quality and safety, and without having to add new materials particularly where wetted surfaces are involved.

SUMMARY OF THE INVENTION

The shortcomings of the prior art are overcome by the present invention, which describes a system and method for supplying electrical power to a device, such as a filter element or an electrical component thereon, located within a housing. In some cases, the use of wires inside the housing may be impractical, due to internal conditions, such as fluid flow, pressure or temperature. This invention requires no physical connections between the power source and the one or more enclosed electronic components, thereby reducing the risk of poor connections, and increasing the useable life of the overall system. In one embodiment, a housing adapted to receive a filter element in the form of a filtration cartridge, such as that commercially available from Millipore Corporation and sold under the name Filter Cartridge Housing Series 3000, is provided, and a conductive coil is positioned in the housing base, and a second coil is positioned in the filter element. Current is then passed through the coil in the housing base. Through induction, a current is created in the second coil in the filter element, in much the same way as a transformer functions. This transfer for power requires no physical electrical connection and also places no limits on the amount of power that can be induced in the filter element coil. In a second embodiment, the filter element comprises tangential flow filtration (TFF) cassettes, and one or more coils are placed within the cassettes to achieve the same result. The inductive field may interfere with the operation of the various electronic functions, such as communications, sensing or other activities. To overcome this issue, an energy storage component, such as a capacitor, is included in the filter electronics. In this way, the power generated by the inductive field can be stored, and used when the inductive field is no longer present.

DETAILED DESCRIPTION OF THE INVENTION

Figure 1:
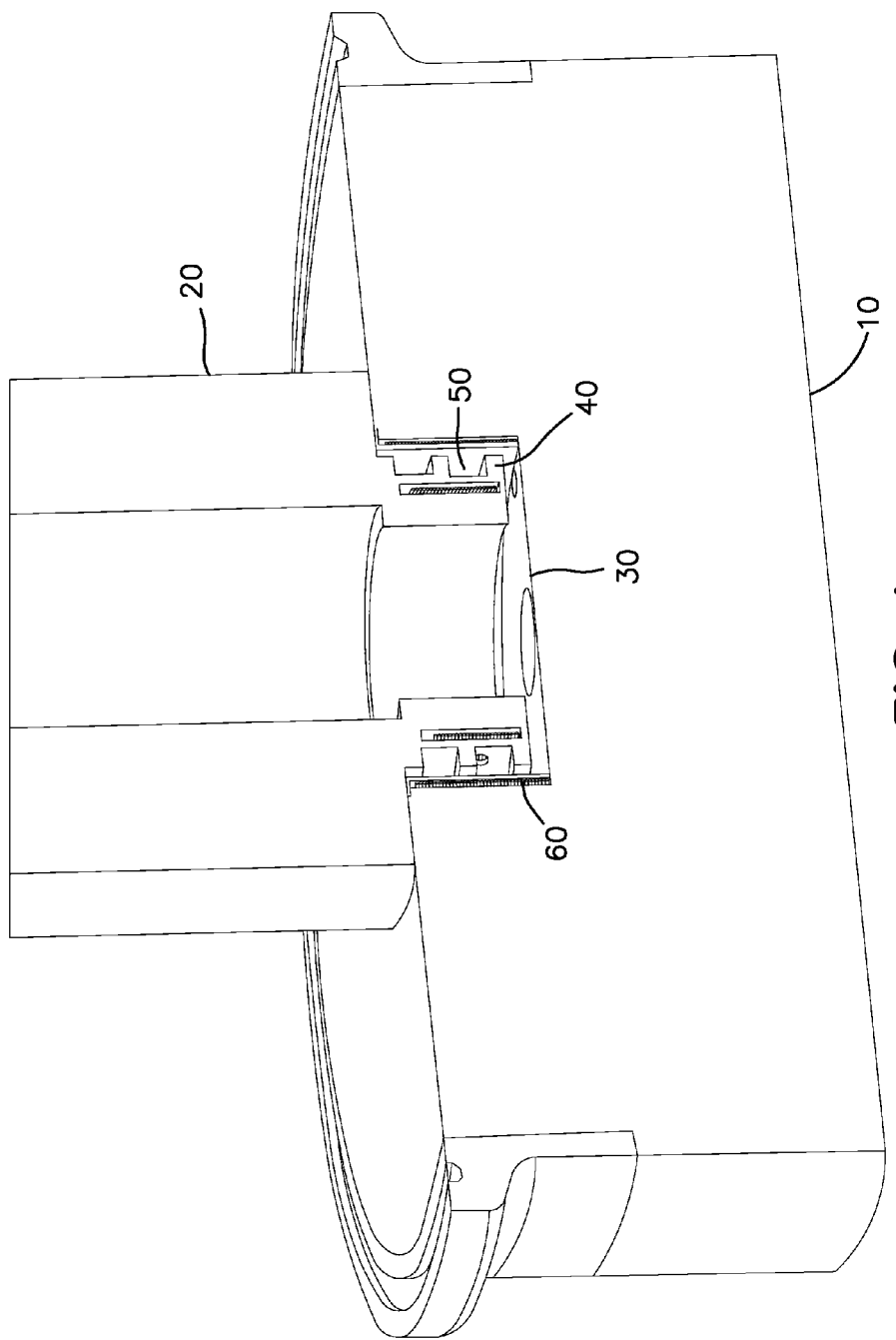
FIG. 1 illustrates a representative code adapter, housing base with coils and filter element in accordance with the present invention.

FIG. 1 illustrates a representative filter housing base 10 and an associated filter element 20. In the embodiment shown, the base and filter element are that of a device Cartridge Filter and Series 3000 Housing, commercially available from Millipore Corporation. The filter element has a membrane, through which materials are passed, and the corresponding structure or frame necessary to support this membrane. Surrounding this assembly is typically a housing dome, preferably constructed of stainless steel or some other non-corrosive material. Also, inlets and outlets are typically present, but have been omitted from FIG. 1 for clarity. Housing base 10 typically contains one or more matable portions, such as cavities 30, each adapted to mate with and hold a filter element. These cavities typically have one or more inlet and output ports in them, to allow fluid to pass through the filter element. Into this cavity 30, a filter element is inserted. The filter element 20 preferably has a matable portion, such as a smaller end 40, which fits within the corresponding matable portion of the housing base 10 (e.g., the cavity 30). The matable portion of the filter element preferably has one or more areas with radially extending members defining between them grooves 50. One or more gaskets, or O-rings (not shown), each preferably constructed from rubber or another suitable flexible material, are preferably positioned in the groove created between these ridged areas 50 to effectuate a liquid tight seal between the filter element and the housing base.

In a preferred embodiment, an electrically conductive coil 60 is embedded in the housing base 10, circumscribing the cavity 30. This coil is preferably constructed from electrically conductive material, in the form of a wire and wound to form a coil. In accordance with known electromagnetic theory, the greater the number of windings, the greater the amount of power that can be transmitted. Preferably the coil is embedded in the housing such that it occupies an area corresponding to the surface area of the cavity. In other words, the coil extends the entire length of the cavity wall, as shown in FIG. 1. Alternatively, a coil occupying less surface area and extending through only a portion of the cylinder is also possible and within the scope of the invention.

A similar coil is also embedded in the filter element. As stated above, in the embodiment shown, the matable portion of the filter has a smaller end that is inserted into the cavity of the housing base. In the preferred embodiment, an electrical conductive coil is embedded into this smaller end, preferably extending the entire length of the smaller end, as shown in FIG. 1. However, a smaller coil, which extends only a portion of the length of the smaller end can also be used, and is within the scope of the invention.

Figure 2:
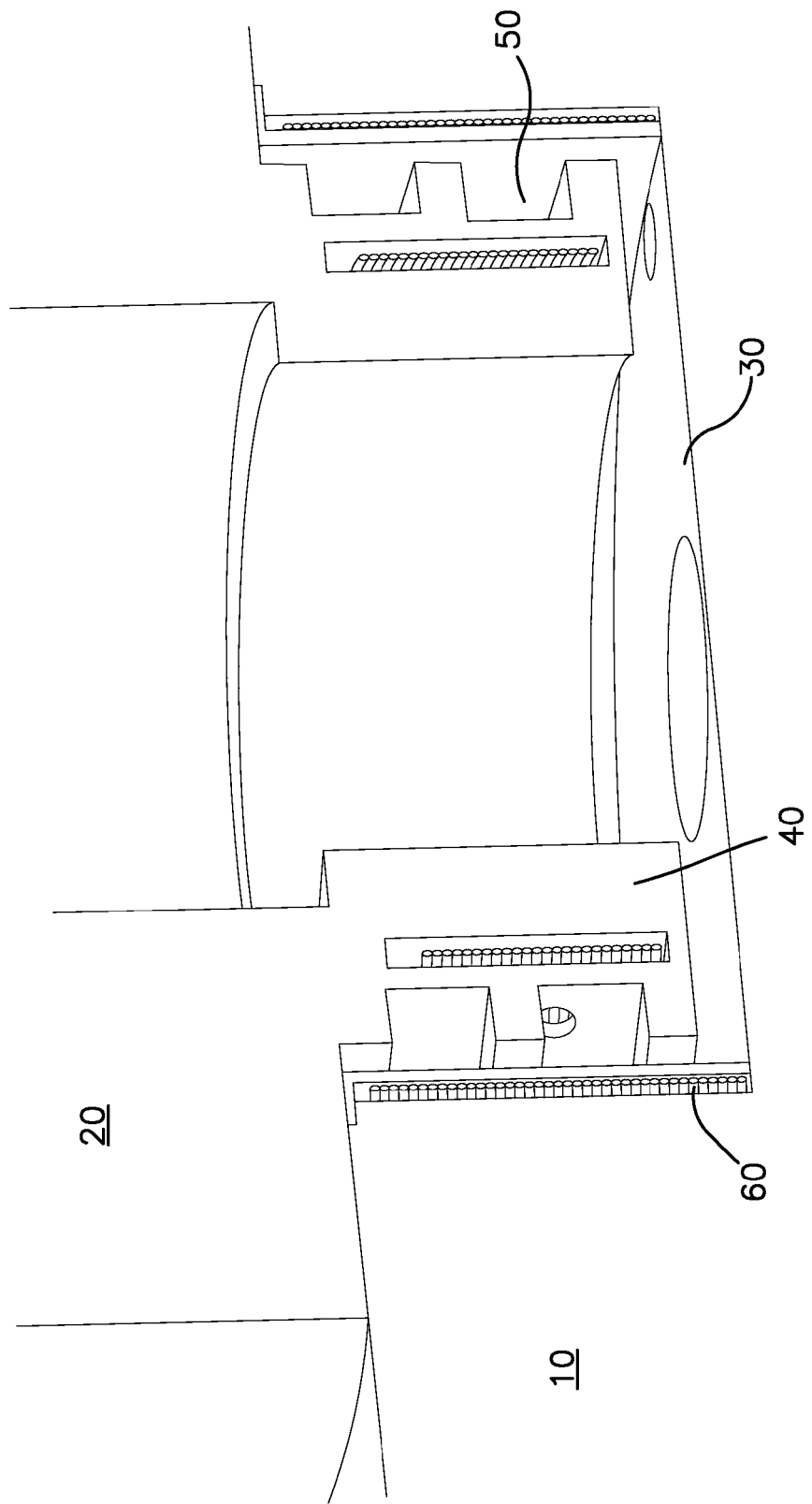
FIG. 2 illustrates an enlarged view of the housing base and the filter element in their operative position in accordance with the present invention. This shows detail depicting code adapter and housing base with coils inside the cartridge.

FIG. 2 shows an enlarged view of the base cavity and filter element. This figure shows the preferred position of the coil in the housing base, as it extends the entire length of the cavity wall. Similarly, the coil within the filter element extends the length of the smaller end. When the filter element is properly seated in the cavity, the two coils will preferably be concentric with one another, thereby preferably defining two concentric cylinders, thereby maximizing energy transfer. The distance between the coils is important, and therefore it is preferable to minimize that spacing.

Another embodiment uses methods to extend or otherwise redirect the magnetic field, such as using an iron core. The insertion of magnetic material coaxially or magnetic shielding outside the coils allows the embodiment to be optimized for the transfer of power and/or reduction of interference with outside electrical components. For example, in one embodiment, the use of an iron rod within the receiver coil (such as in the TFF embodiment described below) improves the efficiency of the transfer of power. In another embodiment, magnetic shielding may be used to reduce or eliminate electromagnetic interference, or to comply with emission standards, such as those provided by government agencies.

Both coils shown in FIG. 2 are preferably completely encased in plastic so as not to be exposed to the external environment. This improves the reliability of the system and also reduces the potential for contamination within the filter system.

The number of turns for each coil is an implementation choice. In one embodiment, these values are chosen so as to create a voltage within the filter element that can be used directly, without regulation. In another embodiment, the number of turns is maximized so as to transmit the maximum amount of energy. The present invention does not require a specific configuration and therefore, all combinations of turns are within the scope of the invention.

A power distribution circuit drives the coil within the housing base, which is also known as the transmission coil. This circuit supplies an AC current or voltage to the transmission coil. Methods of producing such a current or voltage and driving a coil are well known to one skilled in the art and will not be described herein.

The filter element may contain a circuit to regulate the induced voltage. As previously stated, a voltage is induced in the coil of the filter element, which is also known as the receiver coil. The voltage is dependent on the number of turns for both the receiver and transmission coils and the voltage across the transmission coil. In one embodiment, these values are selected such that the voltage induced at the receiver coil is directly usable by the circuitry contained in the filter element. In another embodiment, this voltage is regulated. Voltage regulation is known to those of skill in the art and can be performed a variety of ways. For example, power rectifiers, diodes, capacitors or integrated circuits can be used to perform this function.

By supplying power to the filter element, a multitude of possible applications are possible. For example, devices as simple as LEDs can be utilized. Other powered devices, such as pressure, temperature and concentration sensors and other sensing devices can likewise be used. More sophisticated components, including network components, such as Ethernet, wired LAN or wireless LAN components can also be utilized within a filter element. Incorporating a standard network device within the filter would allow it to be connected directly to a network. In fact, the use of such a network component would also provide a unique identification number for each filter element.

In another embodiment, CPU components, preferably hardened components, can be embedded into the filter element. This allows the filter element to perform onboard calculations and other operations and could, for example, calculate test specifications based on the housing configuration. Other possible devices include wireless LAN devices, such as BlueTooth® or Wi-Fi® components.

As stated above, in the preferred embodiment, the receiver coil is located in the smaller open end of the filter element, while the electronic components are embedded in the closed end of the filter element. One or more wires, preferably embedded in the plastic casing of the filter element, carry the power signals from the coil to the electronic components.

Figure 3:
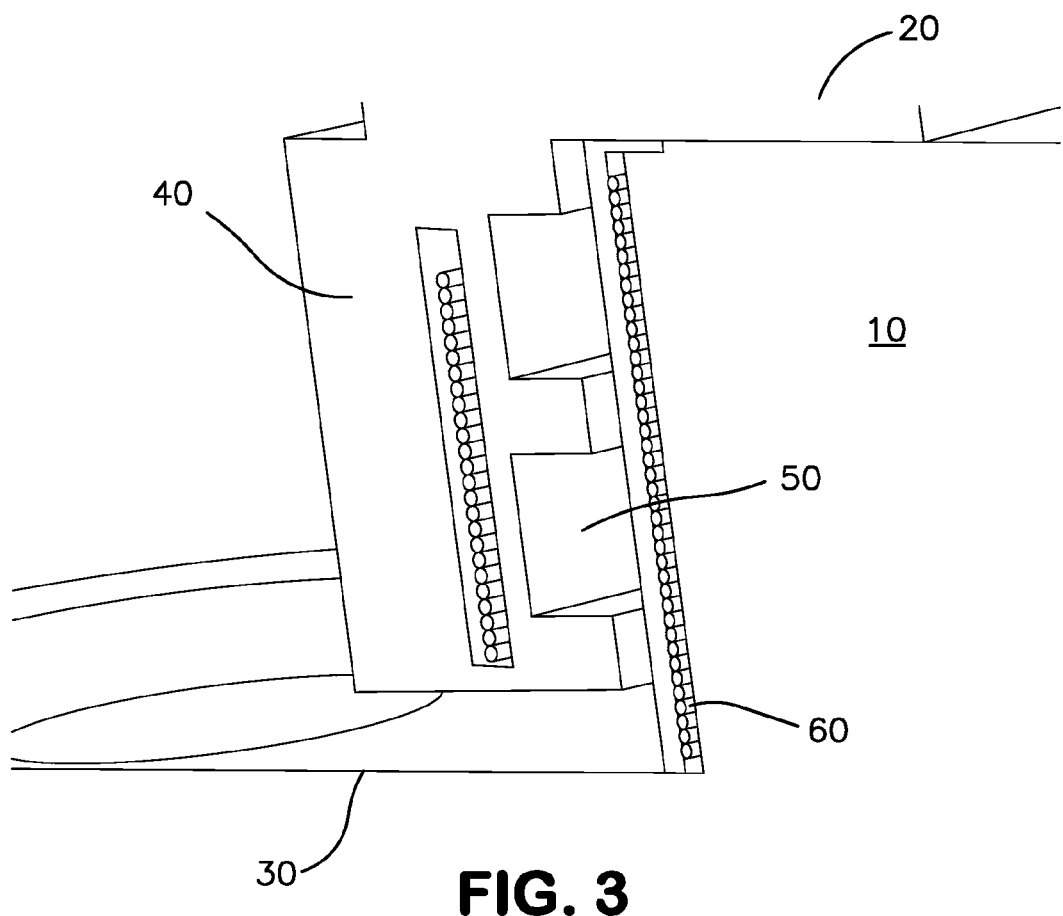
FIG. 3 illustrates an alternate embodiment of the present invention. This is a close-up showing the insert into the housing base to hold and protect the transmission coil.

While the previous embodiment assumes that the housing base is created with the coil embedded in it, this is not a requirement of the present invention. Retrofitting existing housing bases can be done as well. In this embodiment, a small insert, preferably constructed from plastic, is seated within the cavity of the housing base. It is preferably the height of the cavity and is a hollow cylindrical shape. Within this insert is the transmission coil, with one or more wires exiting for connection to a power source. The insert is placed within the cavity as shown in FIG. 3. In one embodiment, the dimensions of the insert are sufficiently small that the filter element can still be positioned in the insert. Since the filter element has gaskets or O-rings that are flexible, the slight reduction in cavity diameter does not preclude the filter element from fitting within the hollow insert. In another embodiment, the housing base is modified so as to increase the diameter of the cavity. In this way, the insert occupies the volume that previously was part of the housing base. Preferably, the housing base is also modified to include a feedthrough so that the wires required by the transmission coil can pass through the base to an appropriate circuit.

Although described above in reference to cylindrical filters, the present invention is equally applicable to other types of filter elements as well.

Figure 4:
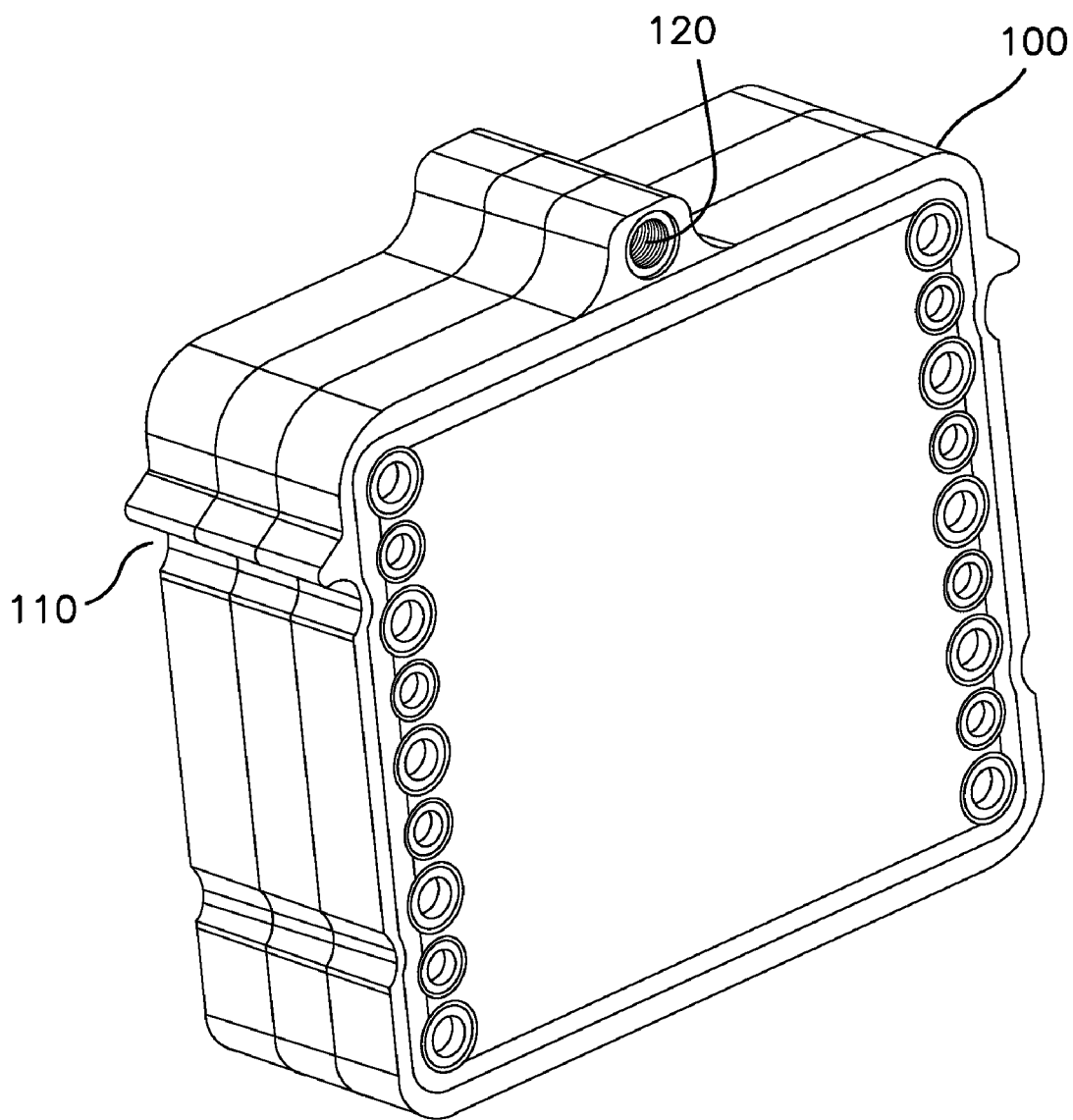
FIG. 4 illustrates a first embodiment utilizing TFF cassettes.

For example, tangential flow filters (TFF) can also incorporate the present invention. As shown in FIG. 4, one or more TFF filters, or cassettes, 100 are typically arranged in parallel, held together with a holder (not shown). This holder typically consists of a plate at either end of the TFF configuration, with fastening mechanisms, such as bolts or clamps, passing through the plates and the cassettes, thereby holding the entire system together. Preferably, indentations, slots or grooves 110 are molded into the TFF cassettes so as to hold them in position.

In one embodiment, the transmission coils are embedded into the end plates that compress and hold the TFF cassettes 100 in place. The transmission coils are preferably located in a groove created along the edge of the plate, facing the open side of the cassette 100. This coil is preferably encased in plastic, which is molded into the groove. The electrical wires that power the transmission coil can be passed through a hole in the end plate, or attached in some other way.

Figure 5:
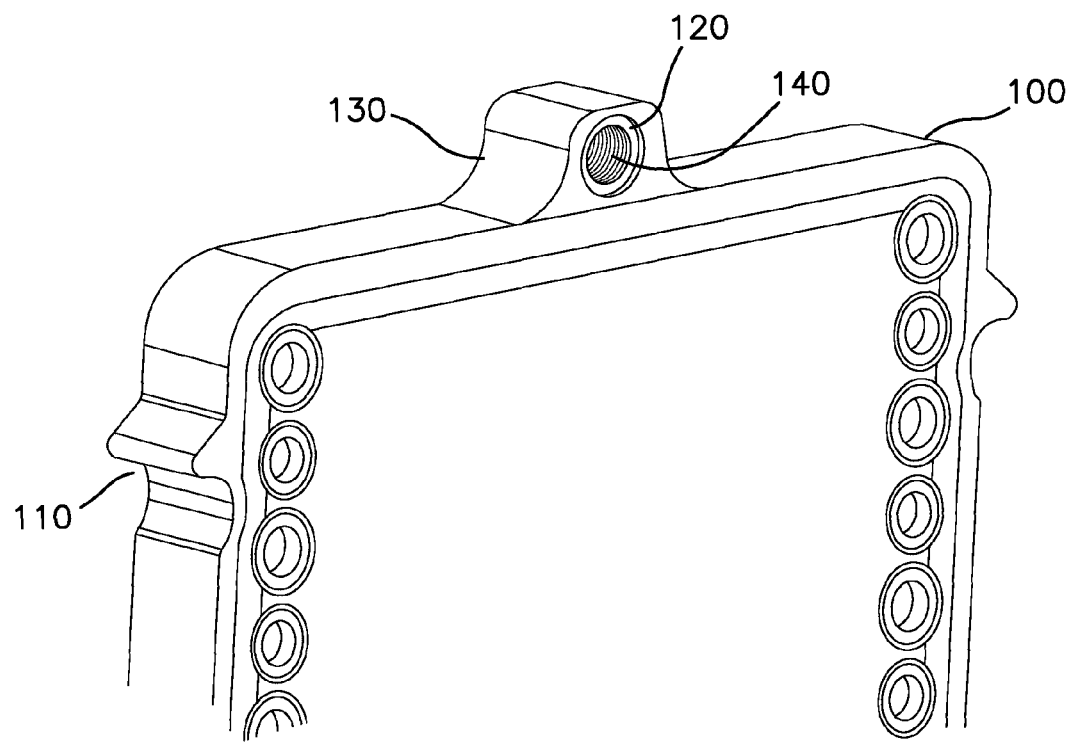
FIG. 5 illustrates a second embodiment utilizing TFF cassettes.

The receiver coils 120 are placed such that their central axis is preferably perpendicular to the end plates. The coil 120 is preferably parallel to the internal membrane and is wound around the outer edge of the jacket. Preferably, the receiver coil 120 is placed in close proximity to the transmission coil so as to affect high power transmission. FIG. 5 shows one such embodiment, where the receiver coils 120 are molded into the outer overmolded jacket 130 in a location outside of the typically fluid path. To improve the induction between coils, the coils can be designed so as to interlock. In other words, the coil 120 of one cassette may have a tapered end that extends beyond the end of the cassette. This tapered end then fits in the hole 140 within the coil of the adjacent cassette. Alternatively, the coils can be molded so as not to extend beyond the cassettes for ease of assembly and usage. In another embodiment, a magnetic member such as a rod is inserted through the holes 140 of the various receiver coils to improve the energy transfer.

Figure 6:
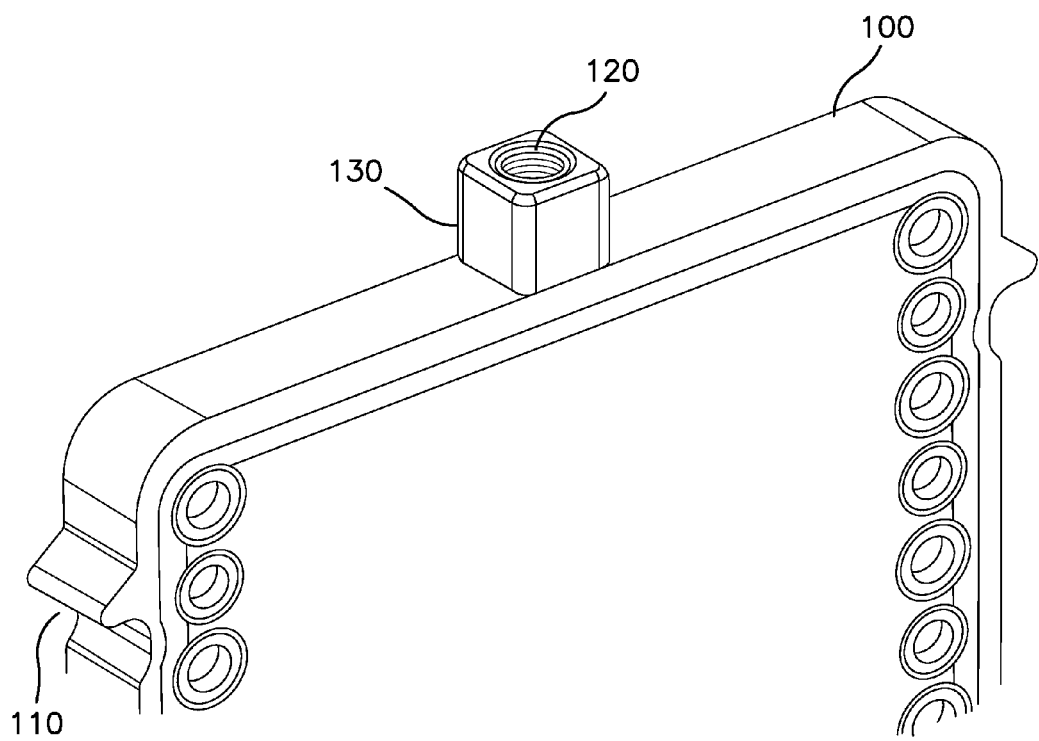
FIG. 6 illustrates a graph showing the interaction between the inductive field and the functioning time.

In another embodiment, shown in FIG. 6, the receiver coil 120 is embedded in the outer overmolded jacket 130 of the TFF cassette. The receiver coil 120 is located in the outer overmolded jacket 130, and is oriented perpendicular to the internal membrane. In other words, its central axis is parallel to the internal membrane. As can be seen in FIG. 6, this location is still accessible, even when the TFF system is fully assembled. The transmission coil is then placed in proximity to, or against, this outer jacket 130 to induce power in the TFF. Preferably, this transmission coil is embedded into a fixture that is then placed in proximity to, or against, the outer jacket. In the case where multiple TFF cassettes 100 are stacked together, multiple transmission coils can be utilized. Alternatively, multiple coils can be placed within a single fixture. Finally, multiple fixtures, each containing a single coil, can be used to supply power to each of the cassettes.

While this application describes cylindrical and TFF filter elements, the invention is not so limited. Any filter element, regardless of shape, can be self powered by placing a powered transmission coil in relatively close proximity to a receiver coil contained within the filter element, such that induction occurs. The above two filter types are simply illustrative of the scope of the invention, and are not meant to limit it to only these embodiments.

In another embodiment, coils are inserted within connectors used to interconnect completely disposable filter housings to the supply tubes or other components. The transmission coil is preferably formed into the outer connector, while the receiver coil is formed in the disposable filter housing. These connections simplify the wiring scheme for transmitting power to a filter, since fluid and electrical interconnects can be made jointly. In addition, since the electrical connection is made without the use of wires, this method reduces the risk of unsanitary contamination by retaining the electrical components within a cleanable and/or drainable conduit.

The inductive coupling allows the generation of power within the filter element or cartridge. However, it may be possible that the inductive field required to generate power makes other functions, such as wireless communication difficult, if not impossible. Thus, in some applications, it may be necessary to disable the inductive field before performing other functions.

In one embodiment, the filter element comprises an energy storage component, such as a capacitor. In the preferred embodiment, this capacitor, along with the other electronic components are encapsulated in the filter element, so as not to be exposed to the conditions within the housing. For example, this capacitor may be located in the end cap, or the end of the filter furthest from the matable portion. When the inductive field is active, energy that is not immediately used is stored by the storage element, available for later use. The size of the energy storage component is dependent on several factors, such as the power consumption of the filter element's electronics and the amount of time that the electronics are required to operate on a single charge. The factors used to determine of the size of the energy storage component are well known to one skilled in the art.

Thus, based on the size of the storage component and the total power consumption of the electronics, the autonomous running time (A) can be determined. This time is the maximum amount of time that the electronics within the filter can operate before another induction cycle is required to recharge the capacitor, or other energy storage component.

To operate the filter element, the inductive field is enabled, thereby allowing the energy storage component to charge. The inductive field is then disabled, and other functions, such as sensing or wireless communications can take place. These activities can persist for a time less than A (the autonomous running time). The time that activity takes place is called the functional time (F). Thus, F must be less than A for proper operation. Some margin should also be incorporated when calculating F, such that the filtering system has time to switch off correctly, before entering recharge mode. This time is referred to as the safety/switching time (S).

To transmit long streams of information, or perform lengthy functions, it may be necessary to charge the energy storage component multiple times. For example, the energy storage component could be charged and then the filter element may perform the first part of a wireless transaction. After time F, the wireless communication is suspended, and the storage component is recharged by enabling the inductive field. After a recharge period (R), the inductive field can be disabled and the filter element is then able to resume the wireless transaction. If necessary, the wireless transaction can be suspended multiple times to allow the storage component to be recharged.

Because the filter element electronics are independently powered, it is possible to utilize protocols other than traditional RFID protocols, thereby potentially allowing faster transfer rates. Other known wireless protocols such as IEEE 802.11a, 802.11b, 802.11g, Bluetooth®, or proprietary protocols utilizing amplitude or frequency modulation can be used.

In one embodiment of the present invention, separate means is used to control and coordinate the various activities. For example, this means can be used to assert a first signal when the inductive field is to be enabled. A second signal (or alternatively, the deassertion of the first signal) signifies that the inductive field is to be disabled. A third signal then notifies the electronics that it is safe to operate or communicate. A fourth signal (or alternatively, the deassertion of the third signal) then notifies the electronics to suspend activity because the inductive field will be enabled shortly.

Thus, the time from the assertion of the first signal to the second signal (or the deassertion of the first) must be greater than, or equal to R, defined above as the required recharge time. The time between the second signal (or the deassertion of the first) and the third signal is the safety/switching time, S. The time between the assertion of the third signal to the fourth signal (or deassertion of the third) is defined as F, the functional time. Finally, the time between the fourth signal (or deassertion of the third) and the next assertion of the first signal is also the safety/switching time, S. Thus, a complete sequence includes a recharge period, two safety/switching periods, and a functional period. As stated above, this sequence can be repeated multiple times, as required.

Furthermore, although the above embodiment assumes a repeatable sequence, this is not required by the present invention. As long as the energy storage component is adequately charged, the inductive field can be disabled, allowing the electronics to operate for an autonomous period of time. Additionally, once the energy storage component is charged, there is no requirement that the functional period begin immediately thereafter. The component is preferably able to store the energy for extended periods of time.

What is claimed is:

1. A method of wirelessly supplying power to a filtering element, comprising:
   providing a first conductive coil;
   providing a second conductive coil in said filtering element, wherein said first coil and second coil form overlapping concentric cylinders, said coils being operative for inducing electrical current to power at least one electronic component in said filtering element; and
   activating an alternating current to energize said first coil, said energized first coil inducing a current in said second coil, wherein said current induced in said second coil powers said at least one electronic component.

2. The method of claim 1, wherein said activating step is performed continuously.

3. The method of claim 1, wherein said filtering element comprises an energy storage element.

4. The method of claim 3, wherein said alternating current is activated for a duration necessary to charge said energy storage element.

5. The method of claim 4, further comprising deactivating said alternating current after said duration.

6. The method of claim 5, further comprising performing a function using said at least one electronic component in said filtering element while said alternating current is deactivated.

7. The method of claim 6, further comprising activating said alternating current before said energy storage element is completely discharged.

8. The method of claim 7, further comprising repeating said deactivating and said performing steps.

9. The method of claim 6, wherein said function comprises wireless communication.

10. The method of claim 6, wherein said function comprises a sensing operation.

11. A method of wirelessly supplying power to a filtering element, comprising:
    providing a first conductive coil;
    providing an energy storage element and a second conductive coil in said filtering element, wherein said first coil and second coil are operative for inducing electrical current to power at least one electronic component in said filtering element;
    activating an alternating current to energize said first coil for a duration necessary to charge said energy storage element;
    deactivating said alternating current after said duration; and
    performing a function using said at least one electronic component in said filtering element while said alternating current is disabled.

12. The method of claim 11, further comprising activating said alternating current before said energy storage element is completely discharged.

13. The method of claim 12, further comprising repeating said deactivating and said performing steps.

14. The method of claim 11, wherein said function comprises wireless communication.

15. The method of claim 11, wherein said function comprises a sensing operation.

* * * * *